US008101271B2

(12) United States Patent
Busch et al.

(10) Patent No.: US 8,101,271 B2
(45) Date of Patent: Jan. 24, 2012

(54) PLA FILM COMPRISING GOOD ANTISTATIC PROPERTIES

(75) Inventors: Detlef Busch, Saarlouis (DE); Dominic Klein, Neunkirchen (DE); Bertram Schmitz, Sarreguemines (FR)

(73) Assignee: Treofan Germany GmbH & Co. KG (DE)

( * ) Notice: Subject to any disclaimer, the term of this patent is extended or adjusted under 35 U.S.C. 154(b) by 881 days.

(21) Appl. No.: 12/093,998

(22) PCT Filed: Nov. 17, 2006

(86) PCT No.: PCT/EP2006/068600
§ 371 (c)(1),
(2), (4) Date: May 16, 2008

(87) PCT Pub. No.: WO2007/060137
PCT Pub. Date: May 31, 2007

(65) Prior Publication Data
US 2008/0286561 A1 Nov. 20, 2008

(30) Foreign Application Priority Data
Nov. 23, 2005 (DE) .................. 10 2005 055 691

(51) Int. Cl.
*B32B 5/02* (2006.01)
*B32B 27/20* (2006.01)
*B32B 27/36* (2006.01)
*B29C 47/06* (2006.01)

(52) U.S. Cl. ........ 428/327; 428/336; 428/480; 428/910; 156/244.11

(58) Field of Classification Search .......... None
See application file for complete search history.

(56) References Cited

U.S. PATENT DOCUMENTS

| 5,208,297 A | 5/1993 | Ford et al. |
| 5,247,058 A | 9/1993 | Gruber et al. |
| 5,357,035 A | 10/1994 | Gruber et al. |
| 6,815,079 B2 | 11/2004 | Rosenbaum et al. |
| 2002/0132960 A1* | 9/2002 | Haile et al. ............... 528/272 |
| 2003/0108701 A1* | 6/2003 | Bond et al. ............... 428/35.7 |
| 2005/0136271 A1* | 6/2005 | Germroth et al. ......... 428/480 |
| 2007/0042207 A1 | 2/2007 | Berger et al. |
| 2007/0134505 A1* | 6/2007 | Hutt ........................ 428/480 |
| 2007/0160782 A1 | 7/2007 | Yatsuzuka et al. |

FOREIGN PATENT DOCUMENTS

| DE | 10121150 A1 | 11/2002 |
| EP | 1388562 A1 | 2/2004 |
| JP | 2003-145677 | 5/2003 |
| JP | 2004-131726 | 4/2004 |
| JP | 2004-223786 | 8/2004 |
| WO | WO-2004/052646 A1 | 6/2004 |
| WO | WO-2005/052056 A1 | 6/2005 |
| WO | WO 2005080078 A1 * | 9/2005 |

OTHER PUBLICATIONS

"Anchor agent for biogradable printing ink comprises aliphatic polyester having preset reduced viscosity and contains specific amount of lactic acid residue", Database WPI, Accession No. 2004-606710.

"Vapor deposition biodegradable film, for packaging foodstuffs, has anchor layer and metal-deposited layer, each of preset thickness formed on poly-lactic acid group or polyester group biogradable resin film", Database WPI, Accession No. 2004-205732.

"Biodegradable polylactic acid group film or sheet used as packaging material, has specified glossiness and haze value and is formed from mixture of polylactic acid group polymer and caramelized starch group biodegradable resin", Database WPI, Accession No. 2004-395267.

"Monolayer lusterless fil or sheet used for packaging, comprises polylactic acid type resin composition containing particulate substance, and has preset surface glossiness", Database WPI, Accession No. 2005-466649.

* cited by examiner

*Primary Examiner* — Ramsey Zacharia
(74) *Attorney, Agent, or Firm* — Connolly Bove Lodge & Hutz LLP

(57) ABSTRACT

The invention relates to a multilayered, film which having a base layer and at least one covering layer, wherein the top layer contains at least one polymer of at least one aliphatic hydroxycarboxylic acid and 0.002 to 20% by weight starch-based particles relative to the weight of the covering layer. The film is characterized by good antistatic properties.

22 Claims, No Drawings

PLA FILM COMPRISING GOOD ANTISTATIC PROPERTIES

CROSS-REFERENCE TO RELATED APPLICATIONS

This application is a national stage application (under 35 U.S.C. 371) of PCT/EP2006/068600 filed Nov. 17, 2006, which claims benefit to German application 10 2005 055 691.4 filed Nov. 23, 2005.

BACKGROUND OF THE INVENTION

The present invention concerns a biaxially-oriented film made up of a base layer and at least one top layer which contains at least one polymer made up of at least one aliphatic hydryoxycarboxylic acid. The invention furthermore concerns a procedure for manufacturing said film, as well as its use.

Films made of synthetic thermoplastics are introduced on a large scale for packaging foodstuffs and other packaged goods. It is essential for these uses that the films feature good antistatic and dynamic friction properties.

Newer developments in the area of packaging concern films made of biodegradable polyesters, like e.g. polylactic acid (PLA). These kinds of films count as particularly environmentally-friendly, as they are based on renewable raw materials and can be disposed of by composting. These materials are, however, fundamentally different to the olefinic polymers like polyethylene or polypropylene, which are introduced for packaging films on a large scale. The transfer of technical teachings about polyester films also often does not succeed, as the same or similar measures often do not achieve the same effect with PLA films.

A comparably good spectrum of usage properties is nevertheless necessary for economic success, in order that this film can be handled with the conventional packaging technologies. Here, the static inhibition of the film in particular, in combination with its dynamic friction properties, plays a central role. Numerous investigations have shown that the migrating additives conventional in the boPP area, which are introduced to improve these properties, do not stand up to testing in the PLA films. Because of the polar character of the PLA polymers, these migrating additives in the polymer matrix show quite different migratory behaviour. Often, these substances arrive not at all, or only in small quantities, on the surface of the PLA film, so that they remain ultimately without effect.

Moreover, in the prior art the introduction of inorganic or organic anti-blocking particles into the top layers of a film as spacers between individual film layers is known. The anti-blocking particles can improve the winding behaviour of a film roll by reducing the contact surface between the film layers, and in addition beneficially influence the friction properties between film sheet and guiding rails on a packaging machine. In general, however, anti-blocking agents do not contribute towards improved antistatic properties of the film.

In the German application number 101 21 153.8, a PLA film is described which contains particularly high quantities of glycerine monostearate in order to improve the static inhibition. However, these films are still in need of improvement.

The addition of high quantities of particles to improve friction is a known solution with known polyester films made of polyethylene terephthalate, but this modification also leads to no improved static inhibition in PLA films with the conventional particles.

Moreover, various effective combinations of migrating additives and particle-forming anti-blocking agents are known from the boPP technologies, which are introduced in order to improve friction and static inhibition. Within the scope of the present invention it was found, however, that these combinations in PLA film, which do not improve static inhibition, even partly have a negative effect, either as particles or additives. It is supposed that the particle-forming additives in the PLA matrix influence the migrating behaviour of the additives, for example some types of particles seem to absorb the migrating additives so that they remain near-ineffective.

SUMMARY OF THE INVENTION

The task of the present invention consisted in making available, for environmentally-friendly packaging or other uses, films which are manufactured out of renewable raw materials, like e.g. PLA, and can be disposed of in an environmentally friendly way, and which feature good anti-static properties. What is more, good lubricant properties and a small friction coefficient are desirable. A good transparency and high shine values are additionally necessary for specific areas of use.

The task is solved by a multilayered, transparent, biaxially-oriented film made up of a base layer and at least one top layer, which contains at least one polymer of an aliphatic hydroxycarboxylic acid and 0.002 to 20% by weight starch-based particles relative to the weight of the top layer.

The task is solved by a multilayered, opaque, biaxially-oriented film made up of a base layer and at least one top layer which contains at least one polymer of an aliphatic hydroxycarboxylic acid and 0.002 to 20% by weight starch-based particles, relative to the weight of the top layer.

Furthermore, a multilayered, non-oriented film of a base layer and at least one top layer, which contains at least one polymer of an aliphatic hydroxycarboxylic acid and 0.002 to 20% by weight starch-based particles relative to the weight of the top layer, is a solution to this task.

Surprisingly, the addition of starch-based particles in at least one top layer improved the static inhibition of the film outstandingly. These kinds of modified films give rise to a clearly smaller electrostatic charge during treatment and manufacture, which itself discharges surprisingly clearly quicker than in film traditionally provided. With this, films can be made available which feature a very good static inhibition and can be unproblematically manufactured.

A DETAILED DESCRIPTION OF THE INVENTION

Preferably, the portion of starch-based particles in the top layer comes to 0.01-10% by weight, in particular 0.01 to 5% by weight, relative to the weight of the top layer, in order to achieve good antistatic properties. Surprisingly, even very small quantities of starch-based particles in a range from 0.01 to 1, preferably 0.1 to 0.5% by weight, effect a significant improvement of the static inhibition. If the particle content comes to larger than 20% by weight, then disadvantageous influence on the optical properties of the film comes about without the static inhibition being further improved. At concentrations under 0.002% by weight, only insufficient antistatic properties can be achieved. Starch-based particles, in the sense of the present invention, mean that the particles can be made up of the unmodified starch-types in each case. However, starch-based particles also comprise such starches as are modified by suitable conversions.

For the present invention, particles based on potato starch, maize starch or wheat starch are basically suitable, such that in each case modified and unmodified types of starch can be used. The original particle size of the particles is comparably uncritical, as the starch particles in the extruder are further chopped up before film extrusion. The starch particles in the film generally feature an absolute particle size of 1 to 15 μm, such that a small quantity of particles can naturally also exist outside this range. In general, these kinds of distributions of the particle size always materialise during chopping down of particles. The overwhelming portion of particles is nevertheless chopped down to a particle size of under 15 μm, so that the particles preferably have particle sizes in the range of 1 to 10 μm. The original mean particle size can come to 100 μm, preferably 1 to 70 μm. The particles can basically have either a regular or irregular shape as desired; however, ellipsoid, oval or round shapes are preferred.

Particles of potato starch are preferred for the purposes of the present invention, particularly modified potato starch, like e.g. dextrin particles. The dextrose equivalent of the particle preferably comes to 5-20% by weight, in particular 8-14% by weight (determined according to the Luff-Schoorl method). Aqueous dispersions of these particles react acidically, the pH value of a 35.2% by weight dispersion of the dextrin particle in distilled water comes to 1.8-2.5. The particles have an increased soluble portion as a result of the modification, for example of 70-90% by weight (measured in a 1% solution of the starch particles in distilled water at 20° C.

In a further embodiment, further conventional organic or inorganic anti-blocking agents, like e.g. mica, silicates, calcium silicate, PMMA-particles, cross-linked silicones (wollastonite) are introduced in the top layer.

The thickness of the top layer generally lies in a range from 0.5 to 10 μm, preferably 0.5-6 μm, in particular 1 to 3 μm. The thicker the top layer is, the larger the diameter of the starch particle chosen should be.

The antistatically-equipped top layer contains 70 to <100% by weight, preferably 80 to <99% by weight of a polymer of at least one aliphatic hydroxycarboxylic acid, hereinafter called PHC (polyhydroxycarboxylic acid). Hereunder homopolymers or mixed polymerisates are to be understood as those made up of polymerised units of aliphatic hydroxycarboxylic acids. Among the PHC suitable for the present invention, polylactic acids are particularly suitable. These are hereinafter called PLA (polylactic acid). Here too, both homopolymers made up solely of lactic acid units and mixed polymerisates containing predominantly lactic acid units (>50%) in combination with other aliphatic hydroxylactic acid units are to be understood by the term PLA.

Aliphatic mono-, di- or trihydroxycarboxylic acids, or rather their dimer cyclic esters, are particularly suitable as monomers of the aliphatic polyhydroxycarboxylic acid (PHC), among which lactic acid in its D or L form is preferred. A suitable PLA is e.g. polylactic acid of the Cargill Dow NatureWorks® company. The manufacture of polylactic acid is known in the prior art and takes place by catalytic ring-opening polymerisation of lactide (1,4-dioxane-3,6-dimethyl-2,5-dione), of the dimer cyclic ester of lactic acid, hence PLA is often called polylactide. The manufacture of PLA is described in the following publications: U.S. Pat. Nos. 5,208,297, 5,247,058 or 5,357,035.

Polylactic acids made up exclusively of lactic acid units are suitable. In this connection, PLA homopolymers which contain 80-100% by weight L lactic acid units, corresponding to 0 to 20% by weight D lactic acid units, are particularly preferred. In order to decrease the crystallinity, even higher concentrations of D lactic acid units can also be contained as comonomers. If necessary, the polylactic acid can additionally feature aliphatic polydydroxycarboxylic acid units different to those of the lactic acid as comonomers, for example glycolic acid units, 3-hydroxypropanoic acid units, 2,2-dimethyl-3-hydroxypropanoic acid units or higher homologues of the hydroxycarboxylic acids with up to 5 carbon atoms.

Preferred are lactic acid polymers (PLA) with an area of melting temperatures from 110 to 170° C., preferably from 125 to 165° C., and a melt flow index (DIN 53 735 measurement at 21.6 N load and 190° C.) of 1 to 50 g/10 min, preferably from 1 to 30 g/10 min. The molecular weight of the PLA lies in a range from at least 10000 to 500000 (number average), preferably 50000 to 300000 (number average). The glass transition temperature Tg lies in a range from 40 to 100° C., preferably 40 to 80° C.

The film according to the invention is made up of multiple layers and comprises at least the base layer and at least one antistatically-equipped top layer of PHC and starch-based particles. If necessary, a further top layer can be applied on the opposite side of the film, such that this second top layer can likewise be equipped with starch-based particles or otherwise formulated. Furthermore, it is possible to attach additional single- or double-sided intermediate layers between the base layer and the top layer(s), by which four- or five-layered films are retained.

In the sense of the invention at hand, the base layer is the layer which features the largest layer thickness and generally makes up 40% to 98%, preferably 50 to 90%, of the total film thickness. The top layers are the layers which form the outermost layers of the film. Intermediate layers are naturally attached between the base layer and the top layers. If necessary, in a separate procedural step coatings can be applied to the antistatic surface of said top layer.

In the sense of the present invention, transparent films are to be understood as films with a light permeability according to ASTM-D 1003-77 of over 75%, preferably over 95%. It was found that the incorporation of the starch-based particles in the top layer does not raise the opacity of the film, or only slightly.

The base layer of the film generally contains at least 70 to <100% by weight, preferably 85 to 99% by weight relative to the weight of the layer, polymers of at least one hydroxycarboxylic acid, hereinafter called PHC (polyhydroxycarboxylic acid). Hereunder homopolymers or mixed polymeristaes are to be understood as those made up of polymerised units of, preferably aliphatic, hydroxycarboxylic acids. Among the PHC suitable for the base layer, polylactic acids, including both homopolymers made up only of lactic acid units and mixed polymerisates predominantly containing lactic acid units (>50%) in connection with other aliphatic hydroxydicarboxylic acids or also other dicarboxylic acids, are particularly suitable.

The base layer as well as the other layers of the film, including the antistatically equipped top layer, can additionally contain conventional additives like neutralising agents, stabilisers, lubricants and fillers. They are advantageously already added to the polymer or polymer mixture before the melting on. Inner lubricants, like e.g. erucic acid amide or glycerine monostearate are added as process auxiliaries.

Basically, white or opaque embodiments of the film can also be provided on one or both sides with the antistatically equipped top layer. For these embodiments, pigments and/or vacuole-initiating fillers are added to the base layer. $TiO_2$ is preferred as a pigment and is added in a quantity of up to 10% by weight, preferably 1 to 8% by weight, always relative to the base layer. Vacuole-initiating fillers are preferably cycloolefin copolymers, generally in a quantity of 0.5 to 30% by weight relative to the weight of the base layer. Details on this are described in the DE 101 21 150, to which explicit reference is made here.

The total thickness of the film can vary within wide boundaries and conforms to the intended purpose of use. The preferred embodiments of the film according to the invention have total thicknesses of 4 to 200 μm, where 8 to 150 μm, in particular 10 to 100 μm, are preferred. The thickness of any intermediate layer(s) present generally comes to 0.5 to 15 μm, in each case independent of each other, where intermediate layer thicknesses of 1 to 10 μm, in particular 1 to 8 μm, are preferred. The thickness of the top layer(s) is chosen independently of the other layers and each preferably lies in the range from 0.1 to 5 μm, in particular 0.2 to 3 μm, such that the second top layer can be different to the first top layer as regards thickness and composition. The values given each refer to one intermediate or top layer. The thickness of the base layer correspondingly results from the difference of the total thickness of the film and the thickness of the top and intermediate layer(s) applied, and can therefore vary within further boundaries analogously to the total thickness.

Basically, biaxially-oriented embodiments of the film according to the invention are preferred. The advantageous effect of the starch-based particles in the top layer nevertheless also improves the static-inhibition of multilayered films with the layer construction described above, which are oriented only in one direction, e.g. only in the longitiduinal or only in the lateral direction, or in no direction at all, i.e. in so-called non-oriented cast films.

The invention furthermore concerns a procedure for manufacturing the multilayered film according to the invention, according to the coextrusion procedure known in itself, which is hereinafter described in detail with the example of a biaxially-oriented film.

Within the scope of this procedure, the course of action adopted is that the melt(s) corresponding to the layers of the film are coextruded through a flat die, the multilayered film so obtained is pulled off on one or several roller(s), and film is subsequently biaxially stretched (oriented), the biaxially stretched film is heat set and, if necessary, corona- or flame-treated on the surface layer intended for treatment.

The biaxial stretching is generally carried out sequentially. For this, stretching is preferably carried out first in the longitudinal direction (i.e. in the machine direction, =MD direction) and subsequently in the lateral direction (i.e. at a right angle to the machine direction, =TD direction). This leads to an orientation of the molecular chains. The stretching in the longitudinal direction takes place preferably with the help of two rollers running at different speeds corresponding to the desired stretch ratio. For the lateral stretching a corresponding clip frame is generally used. Further description of the film manufacture takes place according to the example of a flat film extrusion with subsequent sequential stretching.

The melt(s) is/are pressed through a flat die (sheet die), and the film pressed out is pulled out on one of several outfeed rollers at a temperature of 10 to 100° C., preferably 20 to 80° C., such that it cools off and hardens.

The film so obtained is then stretch along and across the direction of extrusion. The longitudinal stretching is preferably carried out at a roller temperature of the stretching roller from 40 to 130° C., preferably 50 to 100° C., advantageously with the help of two rollers running at different speeds corresponding to the desired stretch ratio, and the lateral stretching preferably at a temperature from 50 to 130° C., preferably 60 to 120° C. with the help of a corresponding clip frame. The longitudinal stretch ratios can vary within a range from 1.5 to 8. In the manufacture of films with a base layer containing vacuole-initiating fillers, a higher longitudinal stretch ratio of 2 to 5 is preferred, whereas films with a transparent base layer are preferably stretched within a range from 1.5 to 3.5. The lateral stretch ratios lie in the range from 3 to 10, preferably 4 to 7.

Attached to the stretching of the film is its heat setting (heat treatment), where the film is held convergent around 0.1 to 10 s long at a temperature of 60 to 150° C. (convergence up to 25%). Subsequently, the film is wound up with a batcher.

Incorporating the starch-based particles into the top layer of the film over a concentrate has shown itself to be particularly advantageous. The concentrates can be based on comparable lactic acid polymers like the top layer or the base layer. If necessary, addition of mixtures of polyhydroxycarboxylic acids and starch-based particles containing the particles in a quantity of 0.002 to 20% by weight relative to the master batch is possible.

It was found that the starch-based particles in the extruder are chopped down by shear strain, and another size distribution of the particles in the film over against the output material is achieved. For this reason, the optical properties of the film, the static inhibition and the other properties which also depend on the particle distribution can also be influenced by the extrusion conditions during film manufacture.

If necessary, the film can be coated for the adjustment of further properties. Typical coatings are adhesion-enhancing, slippage-improving or dehesive-acting coatings. If necessary, these additional coatings can be applied by in-line coating by means of aqueous dispersions before lateral stretching, or off-line.

The film according to the invention is distinguished by very good antistatic properties. Through this a good administration of the film during manufacture, rolling and treatment is possible. Alongside this, transparent embodiments of the film according to the invention have a very good transparency, which is surprisingly not adversely affected by the addition of starch-based particles in the top layer. In addition, it is shown that during manufacture of the film problems do not arise due to accumulations or evaporations. Surprisingly, the film already shows its good antistatic properties directly after manufacture. This advantageous static inhibition is stable over time. This too is a clear advantage over against films with a static inhibition which only engages after the activity of migration sequences. It was found that, through the addition of starch-based particles, the specific surface resistance of PLA is reduced. The specific surface resistance according to the invention lies under $10^{13}$ W/m². Moreover, the film shows a good, i.e. low, kinetic friction, through which the running and treatment properties are additionally beneficially influenced.

Through this advantageous static inhibition, the film can be adopted for the most varied of intended uses, in particular as a packaging film as well as for further treatment steps like printing, lamination or covering. For use as labelling film good static inhibition is likewise advantageous. The film can therefore by used both as an adhesive label with an adhesive coating, as a shrunk wraparound label, as a spot patch label or basically also in the known in-mould processes.

The following measured values were used to characterise the films:

Static Inhibition:

The measurement of the maximum electrostatic charging, of the relative rate of discharge over the time and the surface resistance resulting from it were measured on the Qumat 428 Statics device on the basis of DIN 53486. In this way the charge separation is achieved by a fast-rotating nylon brush rubbing over the film. This operation lasts 30 s, such that the brush travels 10 times (rotating) over a piece of film of dimensions 21 cm length and 8 cm width. The voltage between brush and film measured directly after the end of the charge separation is called maximum charge; the percentile decline in charge in the time period of 20 s following this is called the relative discharge. The discharge curve of the surface voltage is determined on a computer program.

Friction

The measurement of the friction coefficient is carried out as per ISO 8295.

Shine

The shine is measured according to DIN 67530 at an angle of 20°.

The invention is hereinafter described on the basis of execution examples.

EXAMPLE 1

A transparent, three-layered PLA film with a thickness of around 30 µm was manufactured by extrusion and subsequent incremental orientation in the longitudinal and lateral directions. The base layer consisted of nearly 100% by weight of a polylactic acid with a melting point of around 160° C. The layer contains additional stabilisers and neutralising agents in conventional quantities. Both sealable top layers were essentially made up of an amorphous polylactic acid, such that this polylactic acid features an L/D ratio of around 40/60. In addition, the top layers each contained 0.1% by weight starch-based particles and 2% by weight glycerine monostearate (GMS). The thickness of the top layers came to 2.5 µm in each case.

The manufacturing conditions in the individual procedural steps were:
Extrusion: temperatures 170-200° C.
Temperature of the outfeed roller: 60° C.
Longitudinal stretching: temperature: 68° C.
Longitudinal stretching ratio: 2.0
Lateral stretching: temperature: 88° C.
Lateral stretch ratio (effective): 5.5
Fixation: temperature: 75° C.
Convergence: 5%

In this way a transparent film with characteristic shine was obtained. The properties of the film are given in the table.

EXAMPLE 2

A three-layered film as described in example 1 was manufactured. In comparison to example 1, the starch-based particle content was reduced to 0.04% by weight. Otherwise the composition and the structure, as well as the manufacturing conditions, were retained. A transparent film was likewise obtained.

COMPARATIVE EXAMPLE 1

A three-layered film as described in example 1 was manufactured. In contrast to example 1, 0.04% by weight $SiO_2$ (Grace Sylobloc 45) was incorporated as an anti-blocking agent instead of the starch-based particles in both top layers. Otherwise the composition and the structure, as well as the manufacturing conditions, were retained. A transparent film was likewise obtained.

COMPARATIVE EXAMPLE 2

A three-layered film as is described in example 1 was manufactured. In contrasts to example 1, 0.1% by weight silicon particles (Seostar KP 150) were incorporated into both top layers instead of starch-based particles. Otherwise the composition and the structure, as well as the manufacturing conditions, were retained. A transparent film was likewise obtained.

COMPARATIVE EXAMPLE 3

A three-layered film as is described in example 1 was manufactured. In contrast to example 1, no anti-blocking agents and no other additives were incorporated in the two top layers. Otherwise the composition and the structure, as well as the manufacturing conditions, were retained. A transparent film was likewise obtained.

Table 1
A

TABLE 1

| Example | Opacity | Surface resistance in * $10^{11}$ Ohm | Max. charge in KV/m | Rel. discharge after 20 s in % | Dynamic friction coefficient as per ISO 8295 |
|---|---|---|---|---|---|
| Ex. 1 | 1.17 | 2.6 | 40 | 54 | 0.16 |
| Ex. 2 | 0.8 | 9.9 | 50 | 18 | 0.20 |
| Comp. ex. 1 | 1.1 | 21 | 53 | 1 | 0.52 |
| Comp. ex. 2 | 1.2 | 30 | 152 | 1 | 0.6 |
| Comp. ex. 3 | 0.8 | 24 | 205 | 4 | 0.7 |

The invention claimed is:

1. A multilayered, biaxially-oriented film which comprises one base layer and at least one top layer, wherein the top layer contains at least one polymer of at least one aliphatic hydroxycarboxylic acid and 0.002 to 20% by weight starch-based particles relative to the weight of the top layer and wherein the multilayered biaxially-oriented film is transparent or opaque and wherein the starch-based particles in the top layers have a particle size of 1 to 15 µm and the base layer is transparent and contains 90 to <100% by weight of polyhydroxycarboxylic acid.

2. The multilayered, biaxially-oriented film as claimed in claim 1, wherein the film is transparent.

3. The multilayered, biaxially-oriented film as claimed in claim 1, wherein the film is opaque.

4. The multilayered, biaxially-oriented film according to claim 3, wherein the base layer is opaque and contains additional vacuole-initiating filler.

5. The multilayered, biaxially-oriented film according to claim 1, wherein the content of starch-based particles comes to 0.01 to 5% by weight relative to the weight of the top layer.

6. The multilayered, biaxially-oriented film according to claim 1, wherein the starch-based particles are made up of potato starch, maize starch or wheat starch.

7. The multilayered, biaxially-oriented film according to claim 1, wherein the starch-based particles have an ellipsoid or spherical shape.

8. The multilayered, biaxially-oriented film according to claim 1, wherein the starch-based particles are unmodified.

9. The multilayered, biaxially-oriented film according to claim 1, wherein the starch-based particles are modified.

10. The multilayered, biaxially-oriented film according to claim 1, wherein the starch-based particles are made up of modified potato starch.

11. The multilayered, biaxially-oriented film according to claim 1, wherein the aliphatic hydroxylcarboxylic acid is PLA.

12. The multilayered, biaxially-oriented film according to claim 1, wherein the base layer is transparent and contains 90 to <100% by weight of PLA.

13. The multilayered, biaxially-oriented film according to claim 1, wherein the top layer has a thickness of 0.5 to 10 µm.

14. The multilayered, biaxially-oriented film according to claim 1, wherein the top layer is sealable.

15. A packaging film which comprises the multilayered, biaxially-oriented film according to claim 1.

16. A procedure for manufacturing the film according to claim 1, which comprises cutting down the starch-based particles to a particle size of 1 to 15 µm in an extruder.

17. A multilayered film which comprises a base layer and at least one top layer, which is oriented only in the longitudinal direction, wherein the top layer contains at least one polymer of at least one aliphatic hydroxycarboxylic acid and 0.002 to 20% by weight starch-based particles, relative to the weight of the top layer and wherein the starch-based particles in the top layers have a particle size of 1 to 15 µm.

18. The multilayered film as claimed in claim 17, wherein the base layer is transparent and contains 90 to <100% by weight of polyhydroxycarboxylic acid.

19. A multilayered film which comprises a base layer and at least one top layer, which is oriented only in the lateral direction, wherein the top layer contains at least one polymer of at least one aliphatic hydroxycarboxylic acid and 0.002 to 20% by weight starch-based particles, relative to the weight of the top layer and wherein the starch-based particles in the top layers have a particle size of 1 to 15 µm.

20. The multilayered film as claimed in claim 19, wherein the base layer is transparent and contains 90 to <100% by weight of polyhydroxycarboxylic acid.

21. A multilayered, non-oriented film which comprises a base layer and at least one top layer, wherein the top layer contains at least one polymer of at least one aliphatic hydroxycarboxylic acid and 0.002 to 20% by weight starch-based particles, relative to the weight of the top layer and wherein the starch-based particles in the top layers have a particle size of 1 to 15 µm.

22. The multilayered, non-oriented film as claimed in claim 21, wherein the base layer is transparent and contains 90 to <100% by weight of polyhydroxycarboxylic acid.

* * * * *